United States Patent

[11] 3,631,399

| [72] | Inventor | George E. Minns |
| | | Hounslow, Middlesex, England |
| [21] | Appl. No. | 841,429 |
| [22] | Filed | July 14, 1969 |
| [45] | Patented | Dec. 28, 1971 |
| [73] | Assignee | Dewhurst & Partner Limited |
| [32] | Priority | July 12, 1968 |
| [33] | | Great Britain |
| [31] | | 33,481/68 |

[54] PULSE CODE MODULATED TRANSMITTER-RECEIVER TRANSMISSION LINK
6 Claims, 11 Drawing Figs.

[52] U.S. Cl. .................................................. 340/171 R,
325/38, 332/11, 340/172, 340/349
[51] Int. Cl. ........................................................ H04q 9/00,
H04l 3/00
[50] Field of Search ........................................... 340/171,
172, 349; 325/34, 38, 48, 47; 332/11

[56] References Cited
UNITED STATES PATENTS
2,547,024 4/1951 Noble ........................... 340/171

| 3,219,975 | 11/1965 | Finvold ........................ | 340/171 A |
| 3,440,657 | 4/1969 | Cataldo ........................ | 340/171 X |
| 3,484,693 | 12/1969 | Fong ............................ | 340/171 X |
| 3,495,219 | 2/1970 | Clapp et al. ................. | 340/171 |
| 3,533,070 | 10/1970 | Chapman ..................... | 340/172 |

*Primary Examiner*—Donald J. Yusko
*Attorney*—Holcombe, Wetherill & Brisebois

ABSTRACT: A transmission link for the control for example of a window hoist utilizes a carrier signal C selectively frequency modulated by either of two inverse primary periodic pulse signals A1 and A2, with or without selective frequency modulation of the selected primary signal A1 or A2 by either of two similar but lower frequency secondary signals B1 and B2. Each of the primary and secondary signals is detected by periodic charge and discharge of capacitance and periodic sampling of the capacitance charge level. The pulses are of nonunity mark/space ratio, being distinguished by a DC blocking capacitance producing pulses of opposite polarity and nonunity mark/space ratio and hence of unequal amplitudes, detected by a threshold level detecting device.

PULSE CODE MODULATED TRANSMITTER-RECEIVER TRANSMISSION LINK

The present invention relates to transmission links.

One important application of the invention is to a control link for use in the control of, for example, a hoist a lift or a window washer platform. Another possible application of the invention is to the provision of a speech link, particularly in conjunction with a control link as outlined above. A further possible application of the invention is to a telemetry link over a significant distance via a telephone line, for example in the public utility water supply service where pumps are often remote from reservoirs and control of the pump has to be from the reservoirs.

According to the invention there is provided a transmission link comprising means to signal any selected one of a plurality of predetermined conditions and/or requirements from a transmitter to a receiver as a frequency modulation of a carrier signal by a selected one or two inverse primary periodic pulse signals selectively with or without frequency modulation of the selected primary signal by a selected one of two inverse secondary periodic pulse signals.

In a preferred transmission link in accordance with the invention, each of the primary and secondary signals is of rectangular waveform and is formed of two alternating series of periodic pulses of different values and durations, the primary signal pulses being at a lower frequency than the carrier signal whilst the secondary signal pulse are at a lower frequency than the primary signal pulses.

Thus, if the carrier signal is designated as C, the two primary signals as A1 and A2 and the two secondary signals as B1 and B2, there are seven possible signal combinations, as follows:

C alone;
C modulated by A1;
C modulated by A1 itself modulated by B1;
C modulated by A1 itself modulated by B2;
C modulated by A2;
C modulated by A2 itself modulated by B1; and
C modulated by A2 itself modulated by B2.

Control functions requiring a high degree of safety can each be made responsive to a respective combination of all three A, B and C signal frequencies, requiring the correct detection of all three signals for control to take place. In the case of a window washer platform, for example, such a situation would exist in the control of the platform to be raised or lowered by one end only.

On the other hand, for example in a hoist or lift control system in which the doors of the hoist or lift must be closed before movement of any kind takes place, the closure of the doors may be arranged to switch on the carrier frequency C.

In the preferred link in accordance with the invention, signals C, A and B are respectively at 24 kilocycles per second (kHz.), 1 kHz. and 70 cycles per second (Hz.). The modulating primary signal waveform is rectangular, as previously mentioned and varies signal C between approximately 24 and 27 kHz.

However, other frequencies may be used instead.

Arrangements are preferably made to achieve a measure of synchronism between carrier C and modulator signal A so that any frequency change occurs at a predetermined point of the carrier C waveform. Similarly there is preferably synchronization between modulator A and modulator B.

Preferably the transmission line takes the form of a single wire with earth return or alternatively a double wire, and inductive coupling at each end of the wire or wires.

The invention will now be described by way of example only, with reference to the accompanying drawings, wherein.

The illustrated control link comprises a transmission line formed by a single wire 10 with an earth return (not shown), a transmitter 11 (FIGS. 1, 2A and 2B) at one end of the transmission line and a receiver 12 (FIGS. 3 and 4A to 4G) at the other end of line 10.

Figure 1:
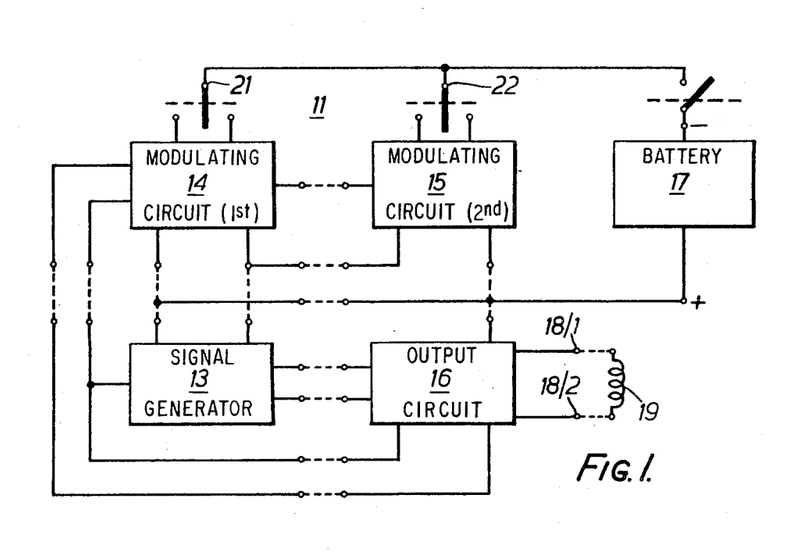
FIG. 1 is a block schematic of a transmitter of a control link in accordance with the invention.

The transmitter 11 comprises a carrier "signal C" generator 13, a first modulating circuit 14 producing primary signals A1 and A2, referred to above, for frequency modulating the carrier signal C, a second modulating circuit 15 producing the signals B1 and B2, also referred to above, for frequency modulating the signals A1 and A2 and an output circuit 16. A 9-volt dry battery supply 17 is arranged to supply circuits 13, 14, 15 and 16, as shown, with operating potential output terminals 18/1 and 18/2 from output circuit 16 supply an output coil 19 which is wound around an annular core 20 (FIG. 2B) through which the wire 10 extends. A changeover switch 21 controls the battery supply to circuit 14 to select either or neither of signals A1 and A2. A second changeover switch 22 similarly controls the battery supply to circuit 15, to control the selection of either or neither of signals B1 and B2.

Figure 2A:
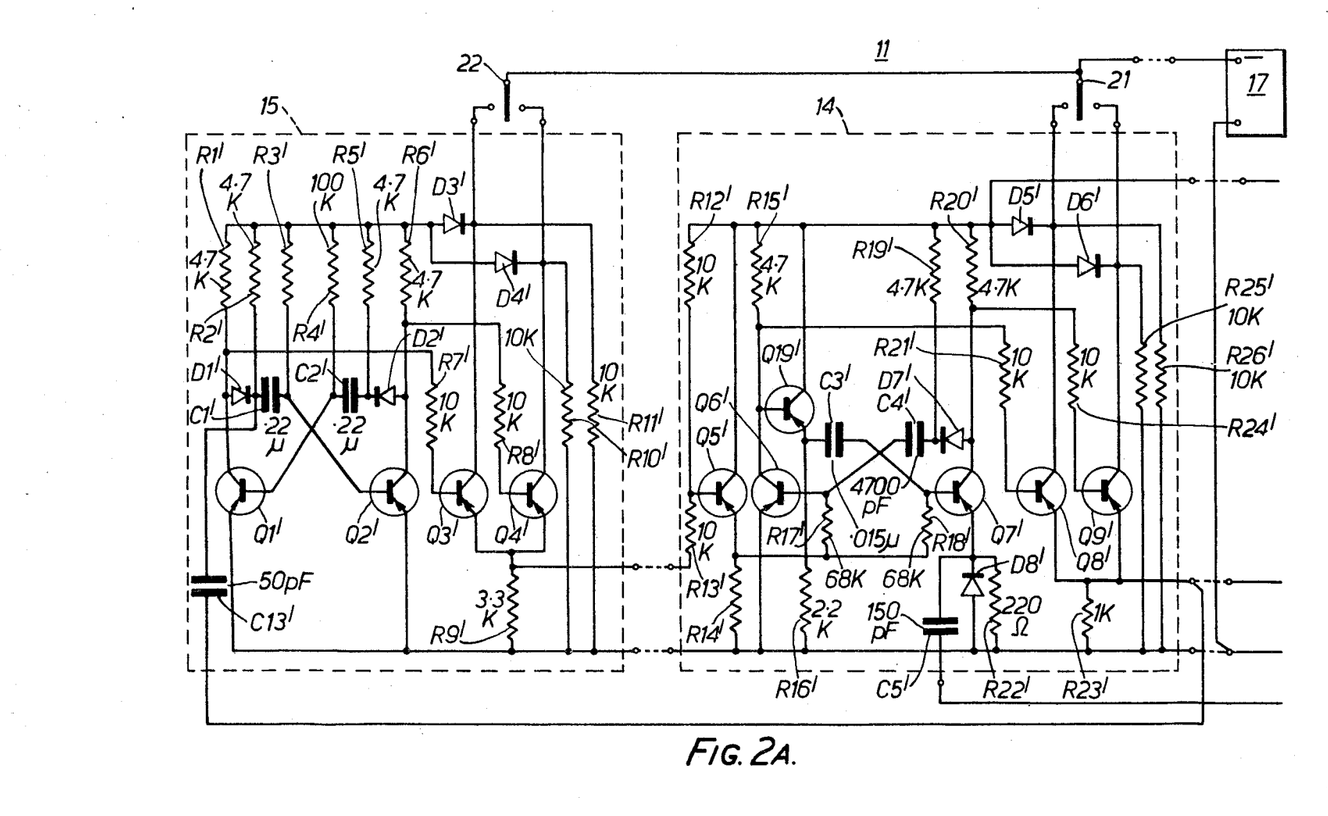
FIGS. 2A and 2B together form a circuit diagram of the transmitter.
Figure 2B:
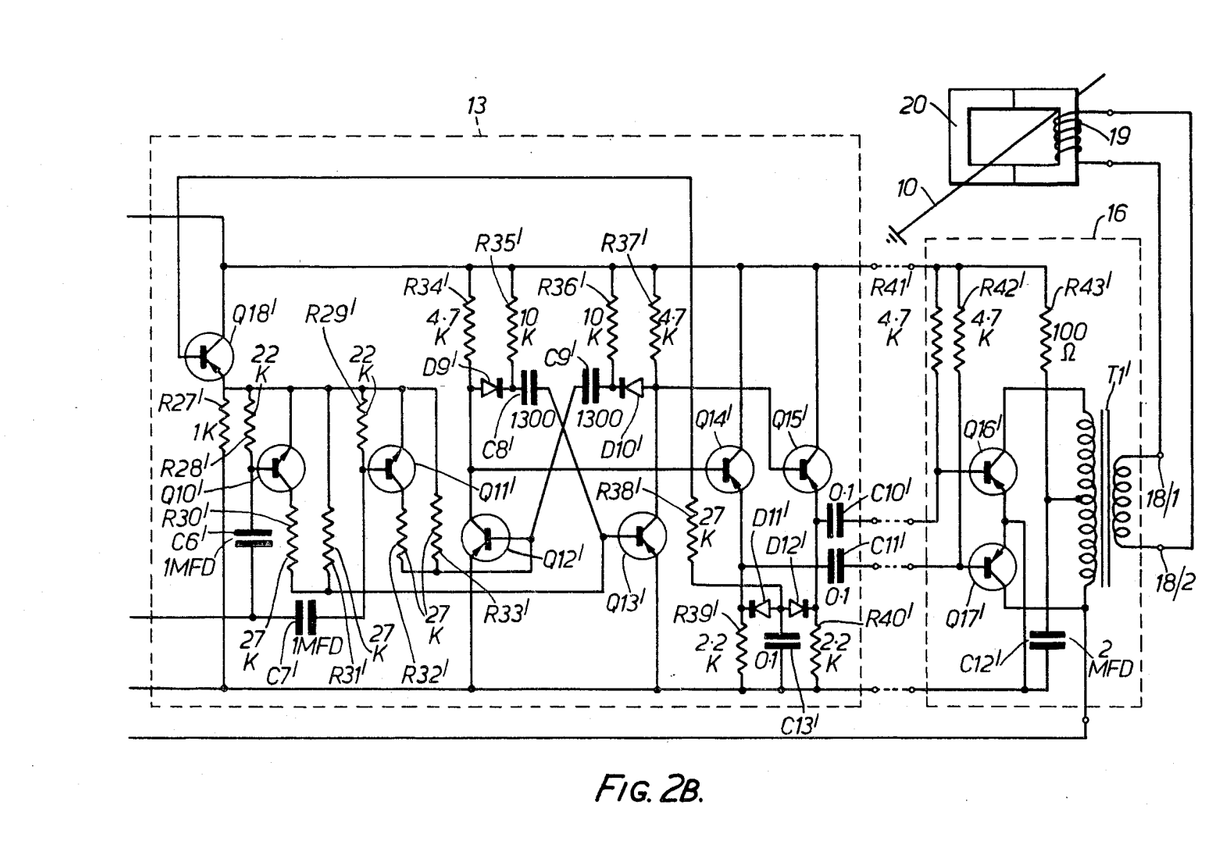
Figure 3:
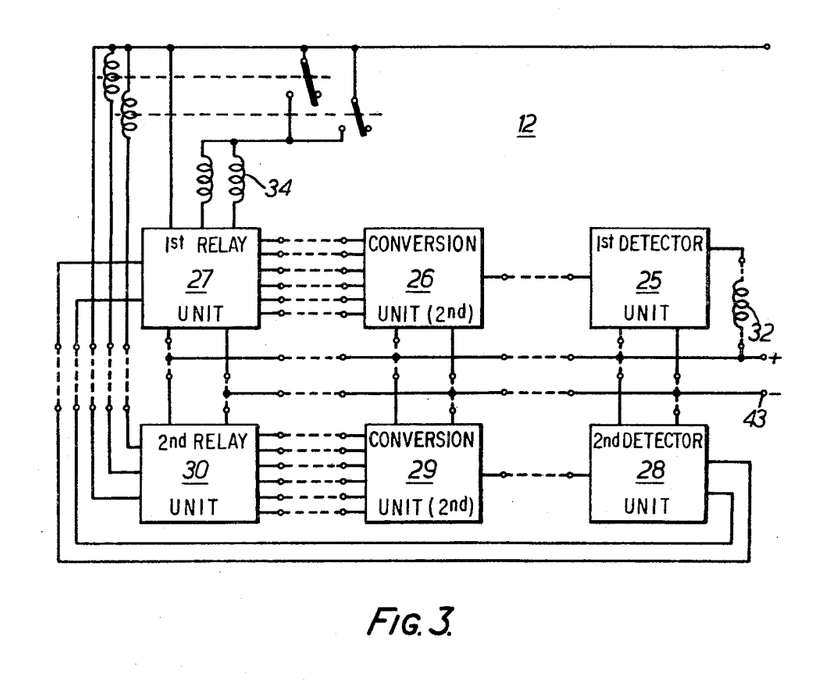
FIG. 3 is a block schematic of a receiver of the control link.

Referring now to FIGS. 2A and 2B for a more detailed description of transmitter 11, the latter comprises transistors Q1' to Q19', resistances R1' to R43', capacitances C1' to C13', diodes D1' to D12', transformer T1', battery supply 17, coil 19, core 20 and switches 21 and 22, connected as shown.

The carrier frequency C generator 13 (FIG. 2B) comprises transistors Q10' to Q15' and Q18', resistances R27' to R40', capacitances C6' to C11' and C13' and diodes D9' to D12', connected as shown. Transistors Q12' and Q13' form the active elements of an astable multivibrator having a mean oscillation frequency of about 20 kHz. Transistors Q10' and Q11' control switching of the frequency of the multivibrator. When transistors Q10' and Q11' are both conducting, resistances R30' to R33' are all effectively in circuit with the multivibrator, and the frequency of oscillation is 24 kHz. When transistors Q10' and Q11' are open, so that resistances R30' and R32' are effectively out of circuit, the frequency of oscillation is 17 kHz. Transistors Q10' and Q11' are controlled together through capacitances C6' and C7' from the voltage across resistance R23' of circuit 14 (FIG. 2A) in a manner to be described hereinafter.

Transistors Q12' and Q13' respectively supply emitter follower transistors Q14' and Q15', and the output is taken via capacitances C10' and C11' to output circuit 16. A connection from the junction of diodes D11' and D12' via resistance R38' is taken to the base of transistor Q18' to provide for self-starting of the multivibrator. Should starting fail to occur, so that both transistors Q12' and Q13' become fully conducting, transistors Q14' and Q15' tend to be turned fully off, hence turning off transistor Q18'. The opening (turning off) of transistor Q18' effectively switches off transistors Q12' and Q13', whereupon inevitable asymmetry of operation causes oscillation to start. Diodes D9' and D10' are arranged to isolate the collectors of transistors Q12' and Q13' from capacitances C8' and C9' respectively, enabling the transistors in turn to switch off rapidly, thus obtaining sharp pulse edges.

The first modulator circuit 14 (FIG. 2A) comprises transistors Q5' to Q9' and Q19', resistances R12' to R26', capacitances C3' to C5' and diodes D5' to D8', connected as shown. Transistors Q6', Q7' and Q19' form an astable multivibrator circuit oscillating at 1 kHz. and producing pulses with nonunity mark space ratio, for example, a mark space ratio of 1:4. To this end, capacitances C3' and C4' are unequal, having the values shown. Transistor Q6', which conducts four times as long as transistor Q7', feeds an emitter follower stage formed by transistor Q19', to the emitter of which capacitance C3' is connected. The outputs from transistors Q6' and Q7' are applied to the bases of transistors Q8' and Q9' respectively. Switch 21 determines which of transistors Q8' and Q9' is supplied with operating potential so as to become operative, thus enabling selection between signals A1 and A2. A connection through capacitance C5' to diode D8' from the collector of transistor Q17' (output circuit 16) ensures synchronization of the oscillation of transistors Q6′ and Q7′ with the oscillation of transistors Q12′ and Q13′ of circuit 13. Circuit 14 produces signals A1 and A2 via transistors Q8′ and Q9′, respectively. Frequency modulation of signal A is achieved via transistor Q5′, the conduction or nonconduction of which controls the relaxation time of the multivibrator Q6′/Q7″.

Modulator circuit 15 (FIG. 2A) comprises transistors Q1′ to Q4′, resistances R1′ to R11′, capacitances C1′ and C2′ and diodes D1′ to D4′, connected as shown. A multivibrator circuit formed by transistors Q1′ and Q2′ oscillates at between 70 and 76 Hz., with unequal mark space ratio governed by the values of capacitances C1′ and C2′. The outputs of transistors Q1′ and Q2′ are applied to transistors Q3′ and Q4′ respectively, having a common load resistance R9′ from which the output is applied to transistor Q5′ of circuit 14. Switch 22 determines which of transistors Q3′ and Q4′ has supply potential, thus enabling selection between signals B1 and B2. Diodes D1′ and D2′ operate in an analogous manner to the diodes D9′ and D10′ referred to above. Synchronization of circuit 15 with circuit 14 is achieved via the connection through capacitances C13′ from Q8′/Q9′ to the junction of D1′ and C1′.

Finally, output circuit 16 (FIG. 2B) comprises transistors Q16′ and Q17′, resistances R41′ to R43′, capacitance C12′ and transformer T1. Transistors Q16′ and Q17′ are connected back to back as shown, and supply the center-tapped primary winding of transformer T1.

The receiver 12 (FIGS. 3 and 4A to 4G) comprises a first detector unit 25, feeding a first conversion unit 26, a first relay unit 27, a second detector unit 28, a second conversion unit 29 and a second relay operator unit 30.

An input toroid 31 (FIG. 4A) similar to the output toroid 20, extends around line 10, and a coil 32 picks the signal from the line 10 and applies it to an optional preamplifier stage 33, forming part of the detector unit 25.

Figure 4A:
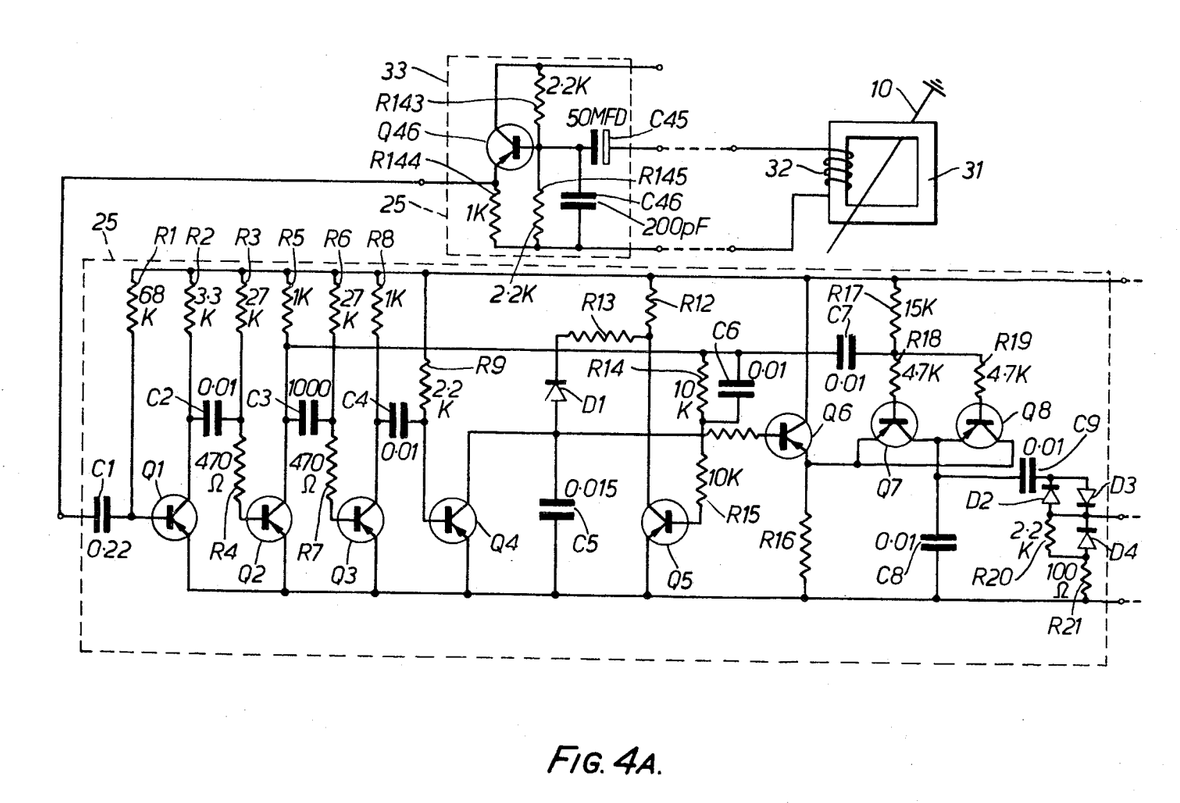
FIGS. 4A to 4G together form a circuit diagram of the receiver of the control link.

The detector unit 25 (including optional preamplifier stage 33) comprises transistors Q1 to Q8, Q47 and (optionally) Q46, resistances R1 to R21 and (optionally) R143 and R144, capacitances C1 to C9 and (optionally) C45 and C46 and diodes D1 to D4, connected as shown.

The preamplifier stage 33, formed by transistor Q46, resistances R143 and R145 and capacitances C45 and C46, applies the amplified signal through coupling capacitance C1 to two further amplifying stages formed by transistors Q1 and Q2, and thence through an inverter stage formed by transistor Q3 to a discharge pulse generator stage formed by transistor Q4. Up to and including the inverter state transistor Q3, the signal *i* of rectangular waveform at the frequency of the carrier C, possibly frequency modulated either by one of the A signals alone or by one of the A signals itself frequency modulated by one of the B signals.

The discharge pulse generator stage Q4 turns on briefly following each negative excursion of the output signal from transistor Q3, thereby discharging capacitance C5. Capacitance C5 thereupon charges up at a controlled rate through resistances R12 and R13 and diode D1. The charging up of capacitance C5 is arrested at the end of a half wave (when the Q2 and Q3 outputs go negative and positive respectively) by the switching on of transistor switching stage Q5, to the base of which an input signal is applied from the collector of transistor stage Q2, through resistances R14 and R15, the resistance R14 being shunted by capacitance C6. It will thus be apparent that the level of charge on capacitance C5 depends directly upon the duration of the half wave following the discharge of capacitance C5 by transistor stage Q4. The diode D1 prevents the discharge of capacitance C5 when transistor stage Q5 turns on. At substantially the same time as charging of capacitance C5 is arrested by the turning on of transistor stage Q5, a charge transfer switching stage formed by transistors Q7 and Q8 is turned on, to charge capacitance C8 up to substantially the same voltage level as capacitance C5, through an emitter follower stage Q6. It is pointed out that, whereas the capacitance C5 is completely discharged once during each complete cycle, the capacitance C8 maintains its charge at substantially the same level, so long as the input signal frequency remains unchanged. However, variation of the input signal frequency due to modulation by signal A or by signals A and B combined produces a corresponding variation in the voltage level of capacitance C8, which is able to respond at the modulation frequencies.

Figure 4B:
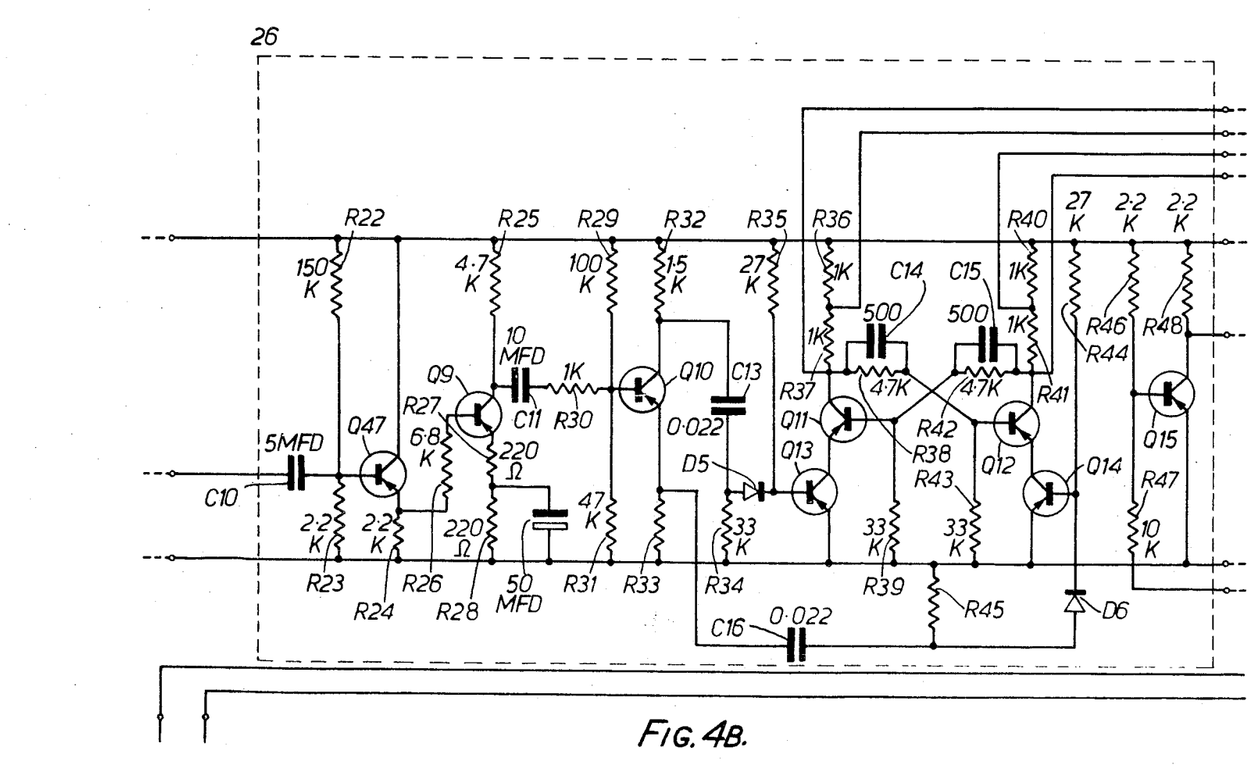

The voltage across capacitance C8 is applied through a coupling capacitance C9 and an impedance-matching network formed by diodes D2, D3 and D4 and resistance R20 to conversion unit 26 (FIG. 4B).

Conversion unit 26 comprises transistors Q9 to Q15 and Q47, resistances R22 to R48, capacitances C10 to C17 and diodes D5 and D6, connected as shown.

The signal from the impedance-matching network D2, D3, D4 and R20 of detector unit 25 is applied to an emitter follower transistor buffer stage Q47, thence to an amplifier transistor stage Q9, and thence through a coupling capacitance C11 and resistance R30 to a phase splitter stage Q10. Two opposite phase signals are taken from the collector and emitter respectively of transistor stage Q10 through coupling capacitances C13 and C16 respectively. The signal from capacitance C16 is applied through diode D6 to the base of a switching transistor stage Q14, while the signal from capacitance C13 is applied through diode D5 to the base of a switching transistor stage Q13. Transistor stages Q13 and Q14 respectively control transistors Q11 and Q12 which together form a bistable circuit, only one of them being turned on at a time.

The signals A1 and A2 (whether modulated by B1 or B2 or not) are both of rectangular waveform and each has a mark space ratio of about 1:4, but with opposite polarities, and the waveform from transistor stage Q9 is rectangular. Since capacitances C13 and C16 pass only alternating current, the volt-second integral of the "positive half wave" will equal the volt-second integral of the "negative half wave" in each case. The shorter half wave will therefore have the larger amplitude. (The effect of this is explained later). The bistable circuit formed by stages Q11 and Q12 is switched in accordance with the modulation frequency A (or A frequency modulated by B).

Figure 4C:
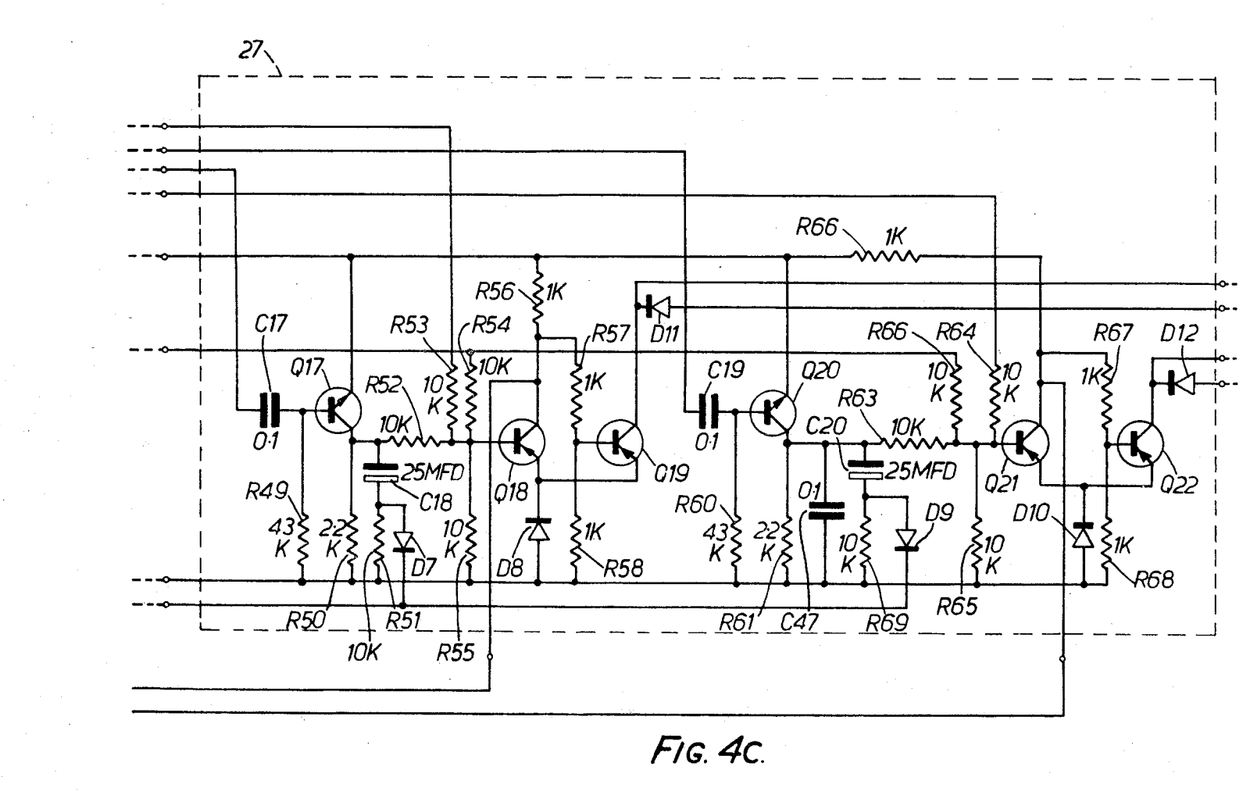
Figure 4D:
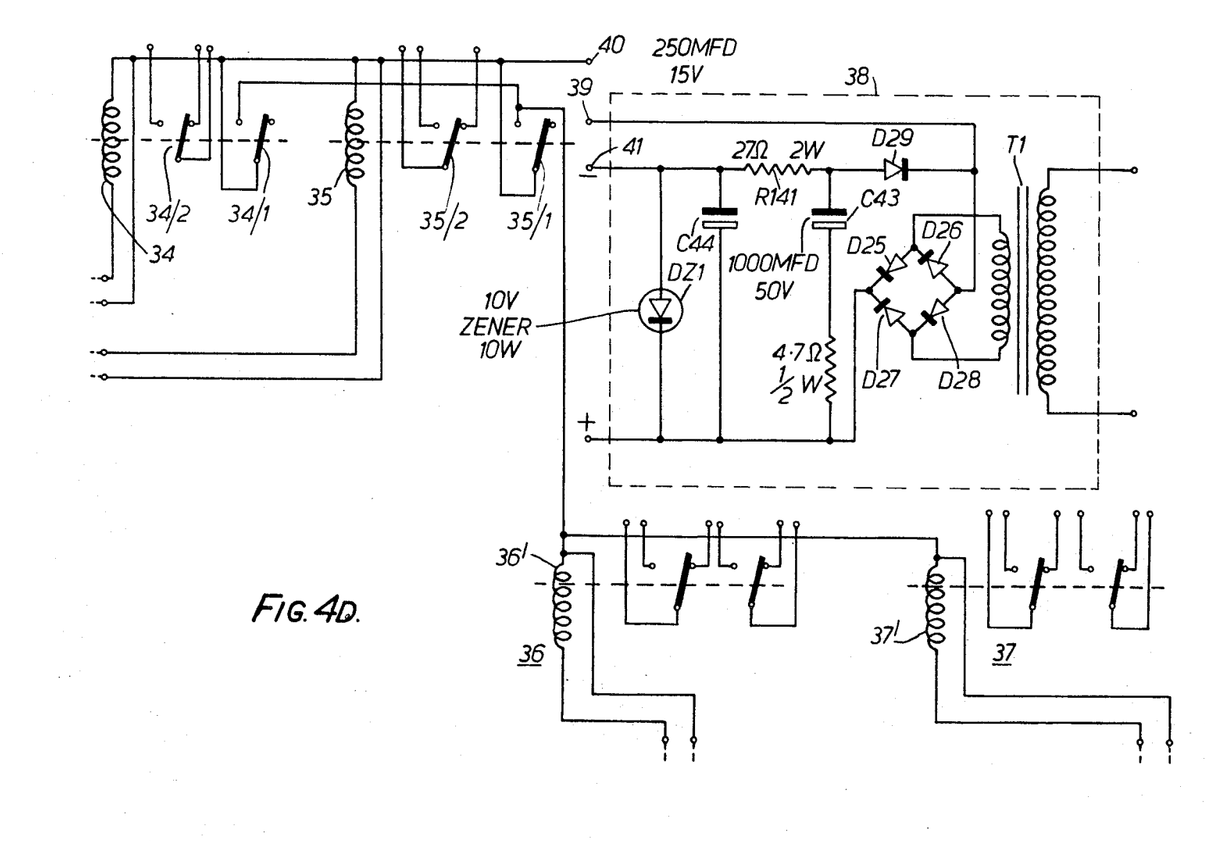
Figure 4E:
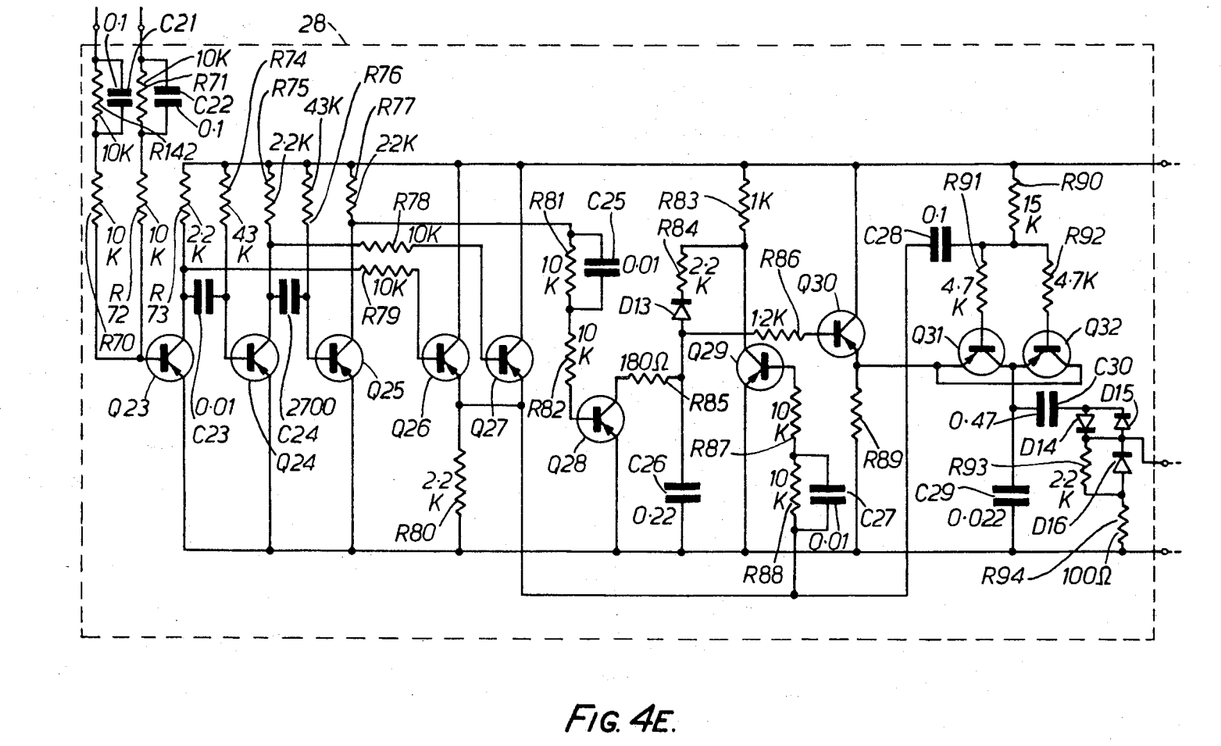
Figure 4F:
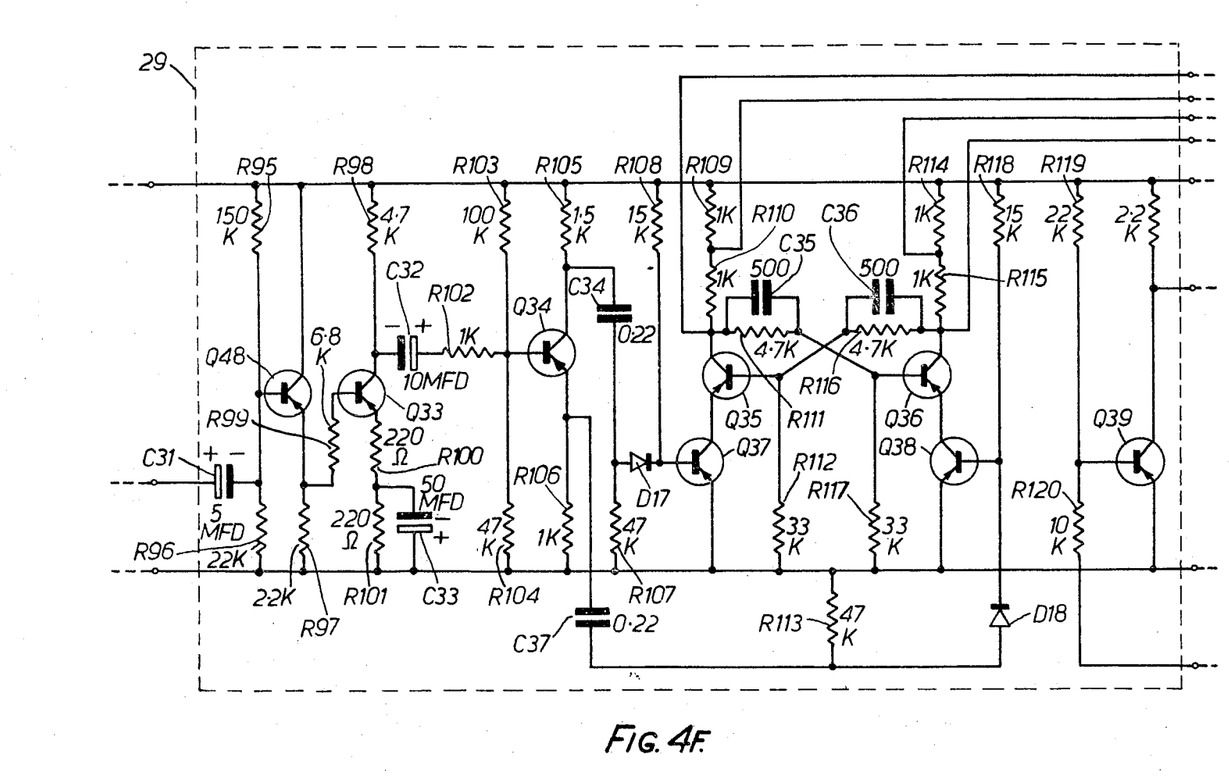
Figure 4G:
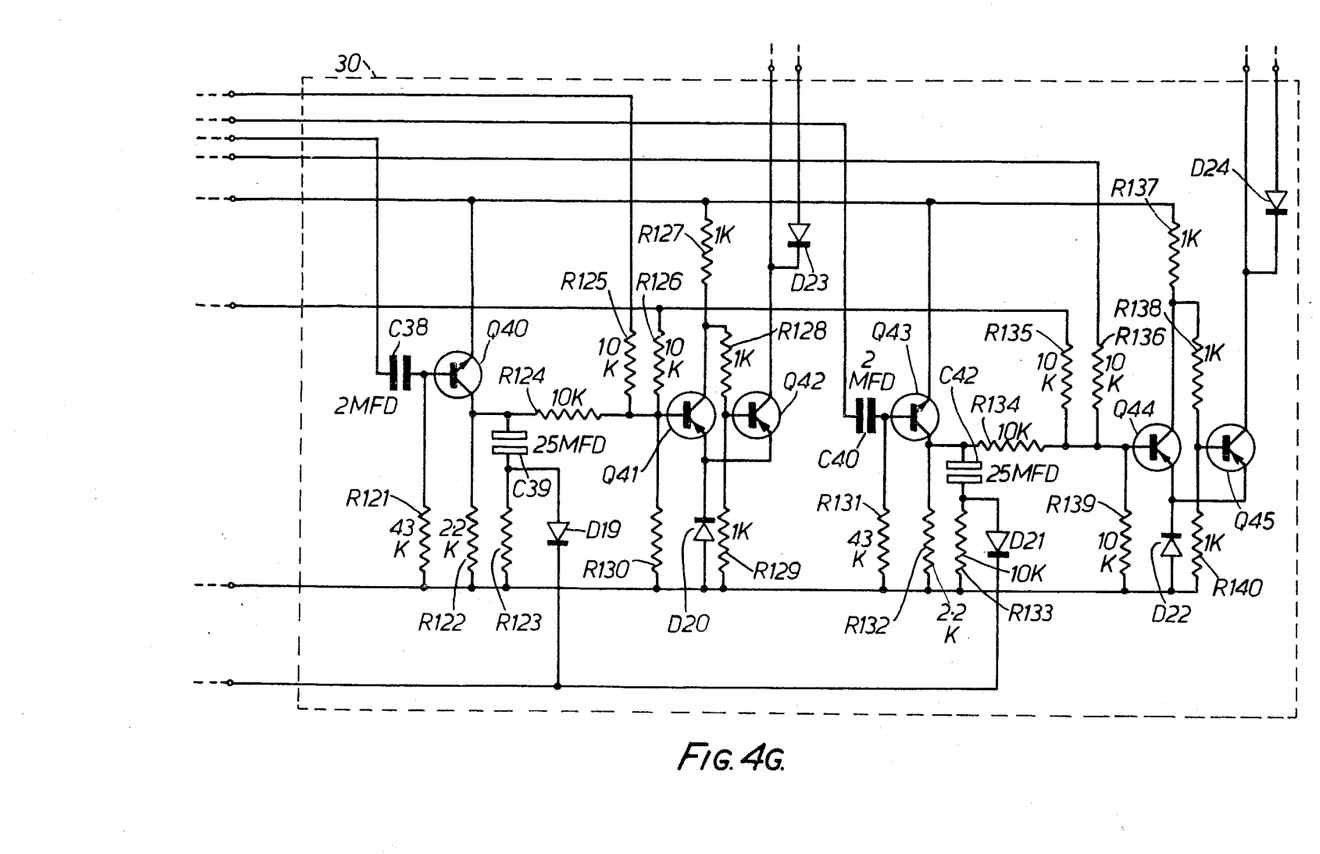

The output from transistor stage Q11 is taken from the junction of resistances R36 and R37 through coupling capacitance C19 of conversion unit 26 (FIG. 4C) to switching transistor stage Q20. The output from transistor stage Q12 (FIG. 4B) is taken from the junctions of resistances R40 and R41 through coupling capacitance C17 of conversion unit 26 to transistor stage Q17 (FIG. 4C). Transistor stage Q17 operates a first relay 34 (FIG. 4D) through transistor stages Q18 and Q19, with a slight time delay induced by capacitance C18. Transistor stage Q20 (FIG. 4C) controls a second relay 35 (FIG. 4D) through transistor stages Q21 and Q22, again with a slight time delay induced by capacitance C20. Only one of relays 34 and 35 is operated at any one time.

As mentioned earlier, signals A1 and A2 are both of rectangular waveform and unequal mark space ratio of, say, 1:4. For example, signal A1 may turn Q17 on for a four-unit period and off for a one-unit period, while turning Q20 off for the four-unit period and on for the one-unit period. During the four-unit period, Q19 conducts (turns on) due to Q17 and Q22 is cut off due to Q20. During the one-unit period, Q19 is held on and Q22 is held off (in the case of the A1 signal) by the switching off of transistor stage Q15 during this period. It was mentioned above that the shorter half wave of signal A1 or signal A2 will be of larger amplitude than the longer half wave through each of capacitances C13 and C16. This feature is utilized in the conversion unit 26 by making Q15 cut off responsive to the larger amplitude positive half wave through diode D7 due to cut off of Q17 during the one-unit period, but to remain conducting during the four-unit period, unresponsive to the lower amplitude positive pulse through D9 from the collector of Q20. Conversely, with signal A2 diode D9 provides the larger amplitude cutoff pulse during the one-unit period and diode D7 provides the ineffective smaller amplitude pulse during the four-unit period. Thus, there is no tendency for either of relays 34 and 35 to chatter.

Outputs from the collectors of transistor stages Q18 and Q21 are applied to the second detector unit 28 (FIG. 4E) in which they are applied together to amplifier stages Q23, Q24, Q25 similar to amplifier stages Q1, Q2, Q3. If either signal B1 or B2 is present, than the signal A1 or A2 is periodically varied at the frequency of signal B1 or B2, to produce a voltage variation on capacitance C26 similar in form to the voltage variation on capacitance C8. Transistor stage Q28 operates analogously to transistor stage Q4, to discharge capacitance C26 at the beginning of each cycle, and transistor stage Q29 operates analogously to transistor stage Q5 to arrest the charging up of capacitance C26 at the end of the first half wave. The charge on capacitance C26 is then transferred through emitter follower transistor stage Q30 by switching transistor stages Q31 and Q32, corresponding to stages Q7 and Q8, to capacitance C29. The voltage level on capacitance C29 thus follows the 1:4 mark space ratio of signal B in the same way that the voltage level on capacitance C8 followed the mark space ratio of signal A, and feeds a phase splitter stage Q33 through an emitter follower stage Q48, corresponding to transistor stages Q10 and Q9 respectively. A bistable circuit formed by transistors Q35 and Q36, driven by trigger stages Q37 and Q38, is switched at the frequency of signal B1 or B2, by reason of the opposite phase inputs from capacitances C34 and C37. The bistable circuit formed by transistor stages Q35 and Q36 controls relays 36 and 37. To this end, two outputs are taken from the bistable circuits, one from the junction of resistances R109 and R110 and the other from the junction of resistances R114 and R115, to capacitances C40 and C38 respectively, to control transistor switching stages Q40, Q41 and Q42 on the one hand, and Q43, Q44 and Q45 on the other hand, analogously to transistor switching stages Q17 to Q22. Thus, relays 36 and 37 are controlled by transistors Q42 and Q45 respectively, so that one only of relays 36 and 37 is switched on at any one time depending upon which of signals B1 and B2 is present. Transistor Q40 is switched on and off for periods in each cycle having the ratio of 4:1 when transistor stage Q34 is switched off and on in the ratio of 4:1, whereas transistor Q43 is switched on and off in the ratio of 4:1. Thus, in the four-unit period, the normal signal applied to the base of transistor Q42 or Q45 causes operation of relay 36 or 37 respectively. In the one-unit period, transistor stage Q39 operates analogously to stage Q15, to hold Q42 or Q45 off if it was turned off during the four-unit period. To do this, reliance is placed upon the fact that the volt-second integral of positive half waves through capacitances C39 and C42 are respectively equal to the volt-second integral of the respective negative half waves. Therefore, the one-unit period will give rise to a pulse of greater amplitude than the four-unit period. The bias applied to transistor stage Q39 is such that stage Q39, which is normally conducting, is only switched off by the positive amplitude pulse through either of diodes D19 and D21 during the one unit period, to apply a negative pulse through resistances R126 and R135 to the bases of transistors Q41 and Q44, holding them both on during the one-unit period, so that neither of transistors Q42 and Q45 conducts during the one-unit period. Relays 36 and 37 have sufficient time delay for either to remain operated during the one-unit period.

Differences in detail between units, 25, 26 and 27 on the one hand and units 28, 29 and 30 on the other hand are due to the different frequencies of operation of the two sets of units.

To provide a safety factor, relay 36 or 37 will only operate respectively if one of relays 34 and 35 is operated, thus closing respective contacts 34/1 and 35/1 in circuit with the coils 36' and 37' of relays 36 and 37.

One application of the link described above is to control of a platform suspended down one wall of a building to carry personnel for cleaning windows of the building. In accordance with the invention, the two ends of the platform may be raised or lowered separately by means of respective electric motors (not shown). Two respective contactor switches controlling the two motors are both connected to contact 35/2 of relay 35, so that both motors are operated together if relay 35 is operated. Only one of the contactor switches, for example, that of the right-hand motor, is connected to contact 34/2 of relay 34, so that only the right-hand end of the platform moves if relay 34 is operated. Referring to FIG. 2, switch 21 is biased to the left, so that transistor stage Q8 is normally operative and relay 35 is thus normally operated, so that both motors move simultaneously. Deliberate operation of switch 21 to the right in FIG. 2 is required to produce movement of the right-hand end alone of the platform. Operation of relay 36 or 37 produces upward or downward movement respectively (either of both ends or of the right-hand end of the platform).

The preamplifier stage 33 may be omitted if desired. However, it is preferred to be included for the window washer platform mentioned above. The transmitter 11 and receiver 12 may each operate off a respective 12-volt dry battery supply. However, if alternating mains voltage is available at either end, a power supply pack 38 (FIG. 4D) may be used, comprising transformer T1, a rectifier bridge formed by diodes D25 to D28, discharge-blocking diode D29, a smoothing circuit formed by capacitances C43 and C44 and resistance 141, and overvoltage protection zener diode Dz1. The coils of relays 34 to 37 may be operated by full wave rectified unsmoothed supply taken direct from the junction of diodes D26, D28 and D29 through terminals 39 and 40, which are connected together. The transistor circuitry is supplied with smoothed full wave rectified supply through terminals 41 (FIG. 4) and 42 (FIG. 3), which are connected together.

It is to be mentioned that the system is fairly insensitive to random variation in the frequencies of the signals A, B and C. It will be observed that there is no tuned inductance-capacitance network (requiring possible adjustment) anywhere in the system.

The system may be used as a speech link, with a microphone (not shown) arranged to frequency modulate signal C in transmitter 11. Detector unit 25 may detect intelligible modulation frequencies, possibly up to 9 kHz. An amplifier and voice reproduction unit (not shown) may be connected to unit 25 for this purpose.

I claim:

1. A signal transmission link comprising transmitter means including first oscillator means to provide a carrier signal, second oscillator means operable to supply a primary signal selectively comprising one of first and second asymmetric periodic waveforms to said first oscillator means to frequency modulate said carrier signal, said second waveform being the inverse of said first waveform, and third oscillator means operable to supply a secondary signal selectively comprising one of third and fourth asymmetric periodic waveforms to said second oscillator means to frequency modulate said primary signal, said fourth waveform being the inverse of said third waveform, and receiver means for receiving the transmitted signal, said receiver means being selectively responsive to said first, second, third and fourth waveforms.

2. A transmission link as claimed in claim 1 wherein said receiver means comprises means responsive to frequency modulations of said carrier signal to provide a first modulation signal as a function thereof, and first output means connected to receive said first modulation signal and selectively responsive to respective ones of said first and second waveforms.

3. A transmission link as claimed in claim 2 wherein said first output means comprises first and second switch means responsive to values of said first modulation signal respectively greater and less than an intermediate value, and threshold means selectively responsive to values of said first modulation signal which differ from the time-averaged value thereof by more than a threshold difference to disable said switch means so that said first and second switch means respond selectively to respective ones of said first and second waveforms inverse thereof.

4. A transmission link as claimed in claim 2 wherein said receiver means comprises means responsive to frequency modulations of said first modulation signal to provide a second modulation signal as a function thereof, and second output means selectively responsive to respective ones of said third and fourth waveforms.

5. A transmission link as claimed in claim 4 wherein said second output means comprises first and second switch means responsive to values of said second modulation signal respectively greater and less than an intermediate value, and threshold means selectively responsive to values of said second modulation signal which differ from the time-averaged value thereof by more than a threshold difference to disable said switch means so that first and second switch means respond selectively to respective ones of said third and fourth waveforms.

6. A signal transmission link comprising transmitter means including first oscillator means for producing a carrier signal for transmission, second oscillator means operable to supply a primary periodic pulse signal selectively having one of two mark-to-space ratios to said first oscillator means to frequency modulate said carrier signal, and third oscillator means operable to supply a secondary periodic pulse signal selectively having one of two mark-to-space ratios to said second oscillator means to frequency modulate said primary signal, and receiver means for receiving the transmitted signal and selectively responsive to the mark-to-space ratios of said primary and secondary signals.

* * * * *